US009665570B2

(12) United States Patent
Chee et al.

(10) Patent No.: US 9,665,570 B2
(45) Date of Patent: May 30, 2017

(54) COMPUTER-BASED ANALYSIS OF VIRTUAL DISCUSSIONS FOR PRODUCTS AND SERVICES

(71) Applicant: International Business Machines Corporation, Armonk, NY (US)

(72) Inventors: Yi-Min Chee, Yorktown Heights, NY (US); Ashish Jagmohan, Irvington, NY (US); Krishna C. Ratakonda, Yorktown Heights, NY (US); Sara Rosenthal, Spring Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 14/511,421

(22) Filed: Oct. 10, 2014

(65) Prior Publication Data

US 2015/0106081 A1    Apr. 16, 2015

Related U.S. Application Data

(60) Provisional application No. 61/889,656, filed on Oct. 11, 2013.

(51) Int. Cl.
*G06F 17/27* (2006.01)
*G06F 17/28* (2006.01)
*H04L 29/08* (2006.01)

(52) U.S. Cl.
CPC ............ *G06F 17/28* (2013.01); *G06F 17/279* (2013.01); *H04L 67/10* (2013.01)

(58) Field of Classification Search
CPC ......... G06F 17/30867; G06F 17/30864; G06F 17/3053; G06F 17/30598; G06F 17/30528; G06F 3/0482; G06F 17/30554; G06F 17/2785; G06F 17/2705; G06F 17/30876; G06F 17/30424; G06F 17/30011; G06F 17/30663; G06F 17/30684; G06F 17/3097; G06F 17/30536; G06F 17/30442; G06Q 50/01; G06Q 30/0201
USPC ............... 704/1–10, 251, 255, 266, E13.003
See application file for complete search history.

(56) References Cited

U.S. PATENT DOCUMENTS

| | | |
|---|---|---|
| 6,470,333 B1 | 10/2002 | Baclawski |
| 8,135,730 B2 | 3/2012 | Lim et al. |
| 8,209,619 B2 | 6/2012 | Carrer et al. |
| 8,402,021 B2 | 3/2013 | Nad et al. |
| 8,510,302 B2 | 8/2013 | Sweeney et al. |
| 8,510,321 B2 | 8/2013 | Ranganathan et al. |

(Continued)

OTHER PUBLICATIONS

Aggarwal et al., Mining Text Data, Chapters 4 and 6, Feb. 9, 2012, pp. 77-128, 163-222.

(Continued)

*Primary Examiner* — Marivelisse Santiago Cordero
*Assistant Examiner* — Stephen Brinich
(74) *Attorney, Agent, or Firm* — Cantor Colburn LLP; Louis Percello

(57) ABSTRACT

A method for analyzing a virtual discussion is provided. The method may include identifying, with a processing device, a first concept relevant to a first subdiscussion associated with an online discussion. The method may also include identifying a second concept relevant to the first subdiscussion, and determining a relation between the first concept and the second concept.

7 Claims, 16 Drawing Sheets

(56) References Cited

U.S. PATENT DOCUMENTS

| | | | |
|---|---|---|---|
| 2003/0217335 | A1 | 11/2003 | Chung et al. |
| 2006/0053151 | A1 | 3/2006 | Gardner et al. |
| 2008/0005234 | A1 | 1/2008 | Newnam Giardino et al. |
| 2008/0228675 | A1* | 9/2008 | Duffy .................... G06F 17/278 706/10 |
| 2009/0094329 | A1* | 4/2009 | Ambati ................. G06Q 10/10 709/204 |
| 2009/0119572 | A1* | 5/2009 | Koivunen ......... G06F 17/30884 715/206 |
| 2010/0138428 | A1* | 6/2010 | Uchino ............. G06F 17/30864 707/751 |
| 2012/0066210 | A1 | 3/2012 | Mukerjee et al. |
| 2012/0209858 | A1 | 8/2012 | Lamba et al. |
| 2013/0138655 | A1 | 5/2013 | Yan et al. |
| 2013/0151531 | A1 | 6/2013 | Li et al. |
| 2013/0159289 | A1 | 6/2013 | Matthews |

OTHER PUBLICATIONS

Agichtein et al., "Finding high-quality content in social media", in WSDM, ACM, 2008, pp. 1-11.

Candan et al., "Creating tag hierarchies for effective navigation in social media", In the Proceedings of the 2008 ACM workshop on Search in social media (SSM '08), 2008, pp. 75-82.

Cimiano et al., "Learning Concept Hierarchies from Text Corpora using Formal Concept Analysis", J. Artif. Intell. Res. (JAIR) 24, 2005, pp. 305-339.

Dachselt et al., "Mambo: A Facet-based Zoomable Music Browser", In Proceedings of the 6th international conference on Mobile and Ubiquitous Multimedia, Oulu, Finland, 2007, pp. 110-117.

Gomez et al., "Statistical analysis of the social network and discussion threads in slashdot", WWW 2008, Apr. 21-25, 2008, pp. 645-654.

Hsu et al., "Hierarchical Comments-Based Clustering", The 26th ACM Symposium on Applied Computing SAC 2011, Taichung, Taiwan, 2011, pp. 1130-1137.

Hsu et al., "Ranking Comments on the Social Web", The 2009 IEEE Int'l Conference on Social Computing SocialCom-09, Vancouver, Canada, 2009, pp. 1-8.

Hu et al., "Comments-oriented document summarization: understanding documents with readers' feedback", SIGIR ACM, Jul. 20-24, 2008, pp. 1-8.

Introne et al., "Analyzing the flow of knowledge in computer mediated teams", CSCW, 2013, pp. 1-15.

Khabiri et al., "Summarizing User-Contributed Comments", Fifth International AAAI Conference on Weblogs and Social Media, Barcelona, Spain, 2011, pp. 1-4.

Kleinberg, "Hubs, authorities, and communities", ACM Comput. Surv. 31(4), Dec. 1999, pp. 1-5.

Lampe et al., "Follow the Reader: Filtering Comments on Slashdot", CHI, ACM, 2007, pp. 1-10.

Lerman et al., "Analysis of Social Voting Patterns on Digg", Proceedings of the ACM SIGCOMM workshop on Online Social Networks, Aug. 18, 2008, pp. 7-12.

Mihalcea et al., "Explorations in Automatic Book Summarization", Proceedings of the 2007 Joint Conference on Empirical Methods in Natural Language Processing and ComputationalNatural Language Learning, Jun. 2007, pp. 380-389.

Radev et al.,"Experiments in single and multidocument summarization using MEAD", In First Document Understanding Conference, 2000, pp. 1-8.

Rashid et al., "A Visual Interface for Analyzing Text Conversations", http://www.cs.ubc.ca/~carenini/PAPERS/birte2012-RashidCarenini.pdf, 2012, pp. 1-17.

Sanderson et al., "Building, Testing, and Applying Concept Hierarchies", Advances in Information Retrieval: Recent Research from the CIIR, W. Bruce Croft, ed., Kluwer Academic Publishers, 2000, pp. 235-266.

Sanderson et al., "Deriving concept hierarchies from text", In the proceedings of the 22nd ACM Conference of the Special Interest Group in Information Retrieval, 1999, pp. 206-213.

Sen et al., "The quest for quality tags", Group '07: Proceedings of the 2007 International ACM conference on Supporting group work. ACM, 2007, pp. 1-10.

Szabo et al., "Predicting the popularity of online content", Communications of the ACM, vol. 53, No. 8, Aug. 2010, pp. 80-88.

Veloso et al., "Automatic moderation of comments in a large on-line journalistic environment", in Proceedings of International Conference on Weblogs and Social Media, 2007, pp. 1-8.

Yang et al., "Ontology Generation for Large Email Collections", In the proceedings of the 2008 international conference on Digital government research, 2008, pp. 254-261.

Yee et al., "Faceted metadata for image search and browsing", In Proceedings of the SIGCHI conference on Human factors in computing systems, Ft. Lauderdale, Florida, USA, 2003, pp. 401-408.

* cited by examiner

US 9,665,570 B2

COMPUTER-BASED ANALYSIS OF VIRTUAL DISCUSSIONS FOR PRODUCTS AND SERVICES

DOMESTIC PRIORITY

This application claims priority to U.S. Provisional Application No. 61/889,656, entitled "COMPUTER-BASED ANALYSIS OF VIRTUAL DISCUSSIONS FOR PRODUCTS AND SERVICES," filed Oct. 11, 2013, which is incorporated herein by reference in its entirety.

BACKGROUND

The present disclosure relates to data analysis, and more specifically, to knowledge extraction from online discussions.

Large amounts of information often are generated in online discussions, including email, online forums, blogs, social media, and the like. Identifying relevant concepts among online discussions can be difficult, given the vast amount of information available. Some existing solutions are available to automatically summarize online documents, such as reviews or digital books, for example, implementing text mining techniques. Other existing solutions are available to perform hierarchical comments-based clustering of online comments.

Existing solutions typically have attempted to rank individual comments, identify controversial comments, or identify key authorities in online forums. In addition, existing solutions are available to annotate comments in online forums. However, solutions that successfully organize information in online discussions in a format that is readily accessible to users have remained elusive.

SUMMARY

According to one embodiment of the present invention, a method for analyzing a virtual discussion includes identifying, with a processing device, a first concept relevant to a first subdiscussion associated with an online discussion, identifying a second concept relevant to the first subdiscussion, and determining a relation between the first concept and the second concept.

According to another embodiment of the present invention, a system for analyzing a virtual discussion includes a subdiscussion filter module configured to identify a first concept relevant to a first subdiscussion associated with an online discussion and a second concept relevant to the first subdiscussion, and a concept relation module configured to determine a first relation between the first concept and the second concept.

According to yet another embodiment of the present invention, a computer program product for analyzing a virtual discussion, the computer program product comprising a computer readable storage medium having program code embodied therewith, the program code executable by a computer to implement identifying a first concept relevant to a first subdiscussion associated with an online discussion, identifying a second concept relevant to the first subdiscussion, and determining a first relation between the first concept and the second concept.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
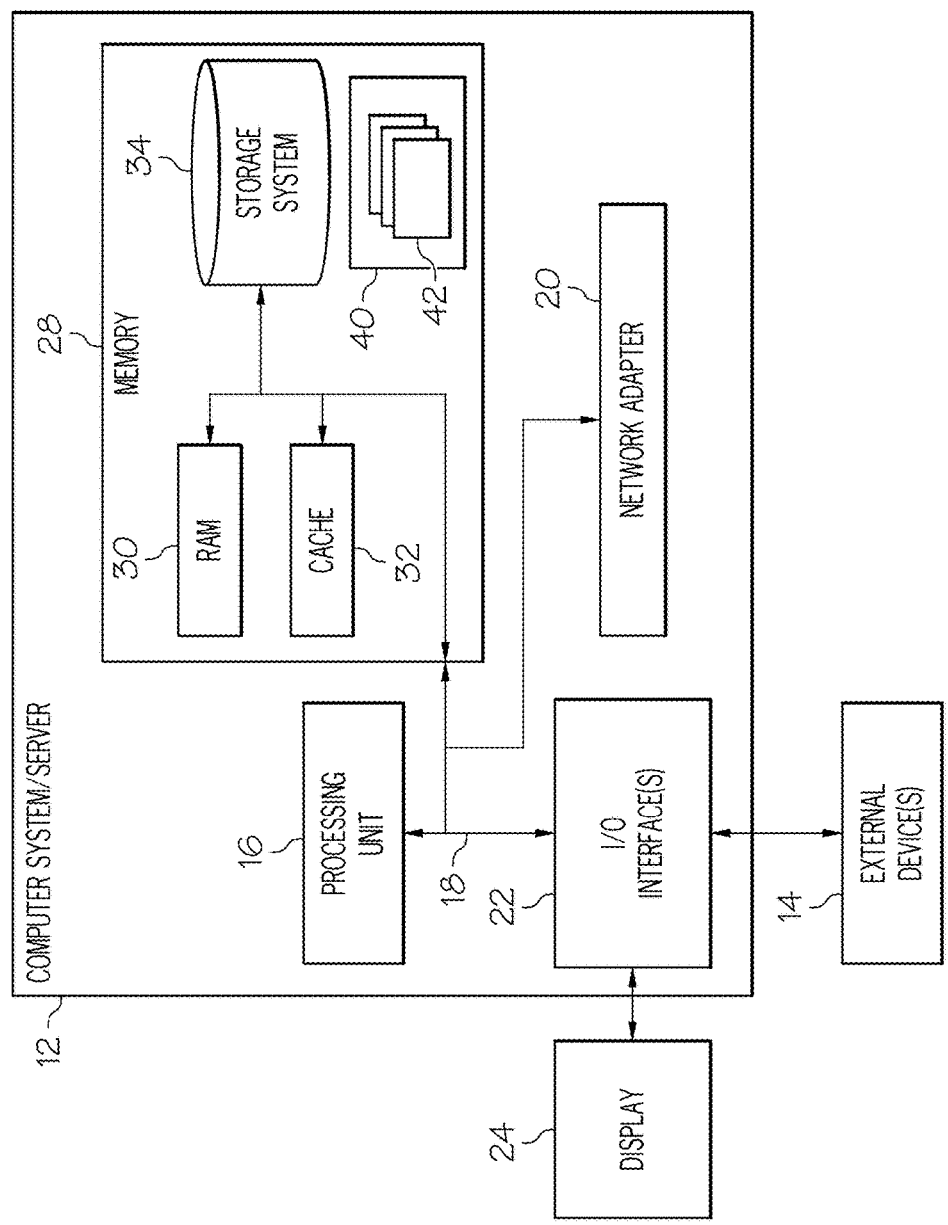
FIG. 1 depicts a cloud computing node according to an embodiment of the present invention.

Embodiments of the present invention may be directed to identifying features, such as key concepts in online discussions, as well as relationships between the key concepts, between multiple subdiscussions within an online discussion, and between discussion participants, and organizing and presenting the concepts and relationships in a useful format. An embodiment of the invention may utilize knowledge extraction techniques to provide a succinct, meaningful overview of an online discussion. An embodiment may perform discussion analytics to extract insights about an online discussion.

An embodiment of the present invention may mine and analyze information from large social discussion repositories and provide discussion summaries and insights, for example, regarding potential points of concern and relevant or innovative solutions. Various embodiments may implement automated or semiautomated identification of domain-specific concepts in online discussions, determine relationships between subdiscussions using concept commonality measures, and infer high-level insights from online discussions. An embodiment may utilize background text corpora to filter out non-domain specific concepts.

In an embodiment, identified relations between concepts and participants may facilitate the extraction, or inference, of insights regarding the concepts. In an embodiment, identified relations between subdiscussions may aid a discussion manager in making inferences regarding multiple subdiscussions in an online discussion.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage systems, and deployed applications, along with control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof, may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
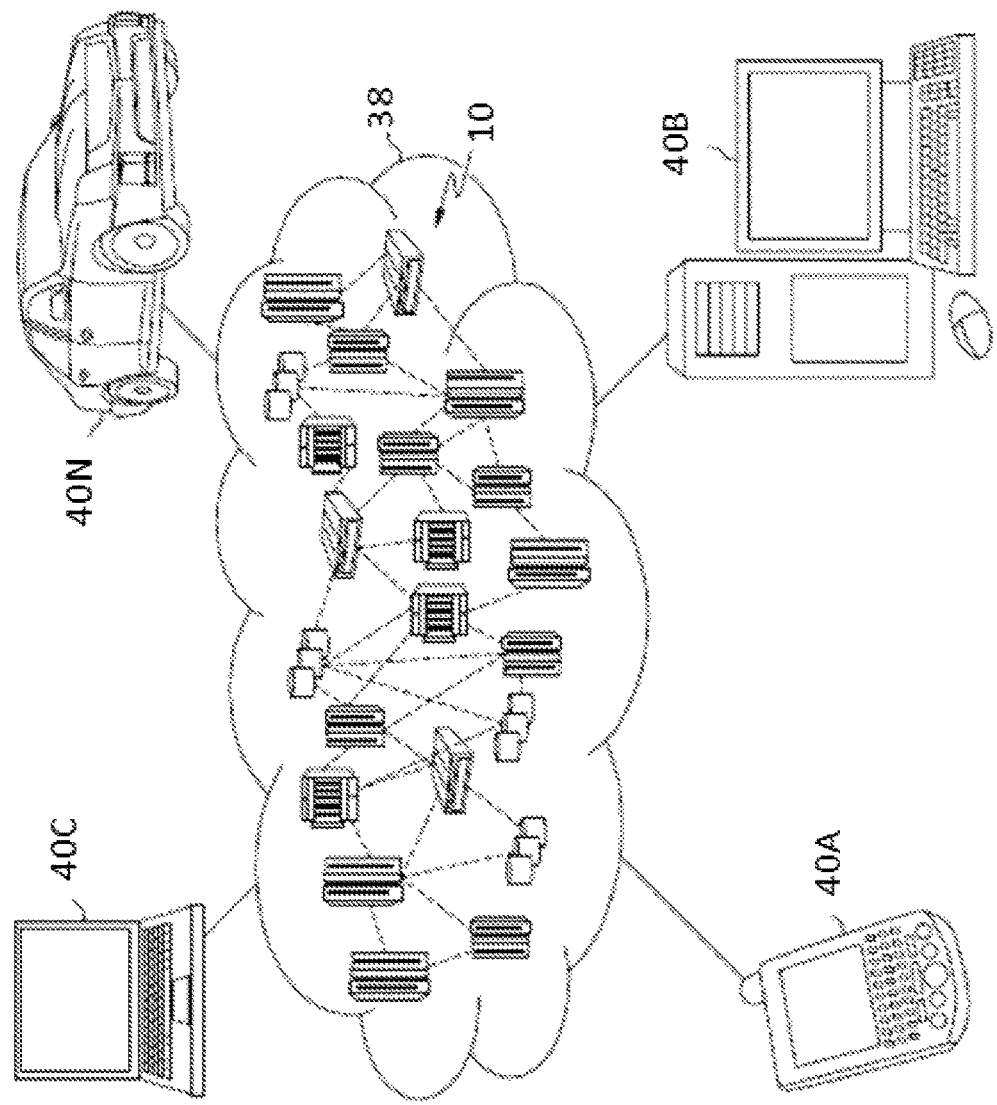
FIG. 2 depicts a cloud computing environment according to an embodiment of the present invention.

Referring now to FIG. 2, illustrative cloud computing environment 38 is depicted. As shown, cloud computing environment 38 comprises one or more cloud computing nodes 10 with which local computing devices used by cloud consumers, such as, for example, personal digital assistant (PDA) or cellular telephone 40A, desktop computer 40B, laptop computer 40C, and/or automobile computer system 40N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 38 to offer infrastructure, platforms and/or software as services for which a cloud consumer does not need to maintain resources on a local computing device. It is understood that the types of computing devices 40A-N shown in FIG. 2 are intended to be illustrative only and that computing nodes 10 and cloud computing environment 38 can communicate with any type of computerized device over any type of network and/or network addressable connection (e.g., using a web browser).

Figure 3:
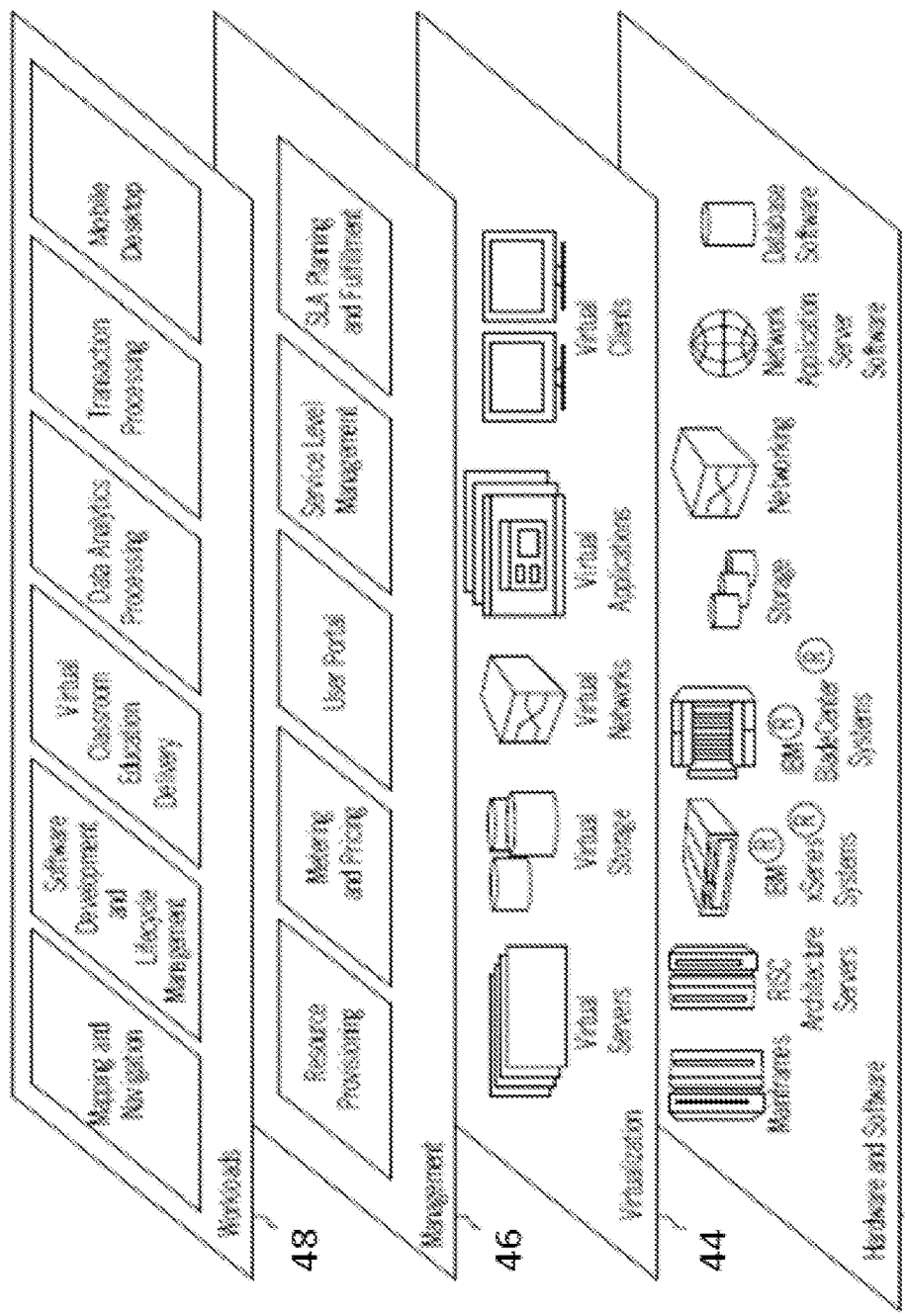
FIG. 3 depicts abstraction model layers according to an embodiment of the present invention.

Referring now to FIG. 3, a set of functional abstraction layers provided by cloud computing environment 38 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 36 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 44 provides an abstraction layer from which the following examples of virtual entities may be provided: virtual servers; virtual storage; virtual networks, including virtual private networks; virtual applications and operating systems; and virtual clients.

In one example, management layer 46 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillments provide pre-arrangement for, and procurement of, cloud computing resources for which a future requirement is anticipated in accordance with an SLA.

Workloads layer 48 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

With regard to the data analytics processing function of the workloads 48 layer, an embodiment of the present invention may provide a virtual discussion analyzer that may be utilized to perform tasks, such as, for example, analysis of online discussions in the cloud computing environment 38 of FIG. 2. For example, referring to FIG. 4, a virtual discussion analyzer 50 in accordance with an embodiment of the present invention may include a text module 52, a domain filter module 54, a subdiscussion filter module 56, a relation module 58, an excerpt module 60, a visualization module 62, a processor 64, and a display 66.

The various modules 52, 54, 56, 58, 60, 62, the processor 64, and the display 66 may be communicatively interconnected by way of data links 68, which may include any connective medium capable of transmitting digital data, as the specific application may require. For example, in any embodiment, the data links 68 may be implemented using any type of combination of known communications connections, including but not limited to twisted pairs of wires, digital data buses, a universal serial bus (USB), an Ethernet bus or cable, a wireless access point, or the like. In any embodiment, any portion or all of the data links 68 may be implemented using physical connections, radio frequency or wireless technology. A person of ordinary skill in the art will readily apprehend that any combination of numerous existing or future communication network technologies may be implemented in association with an embodiment of the invention.

The text module 52 can be configured to receive the text data of a virtual discussion or subdiscussion and clean up the text data to facilitate data analytics processing. A discussion may include any modality of online communication, such as, for example, online forums, blogs, "Idea Jams," chat sites, emails, or the like. The communications may be categorized. For example, communications may be categorized by topic, by location, by participants, by employee, by department, by date, or by any other suitable categorization.

A subdiscussion may include any grouping, category, or subcategory, within a discussion, such as, for example, a thread in an online forum, a comment or response on a blog, a topic in an "Idea Jam," a topical chat room on a chat-site, a string or thread of emails, or the like.

Figure 5:
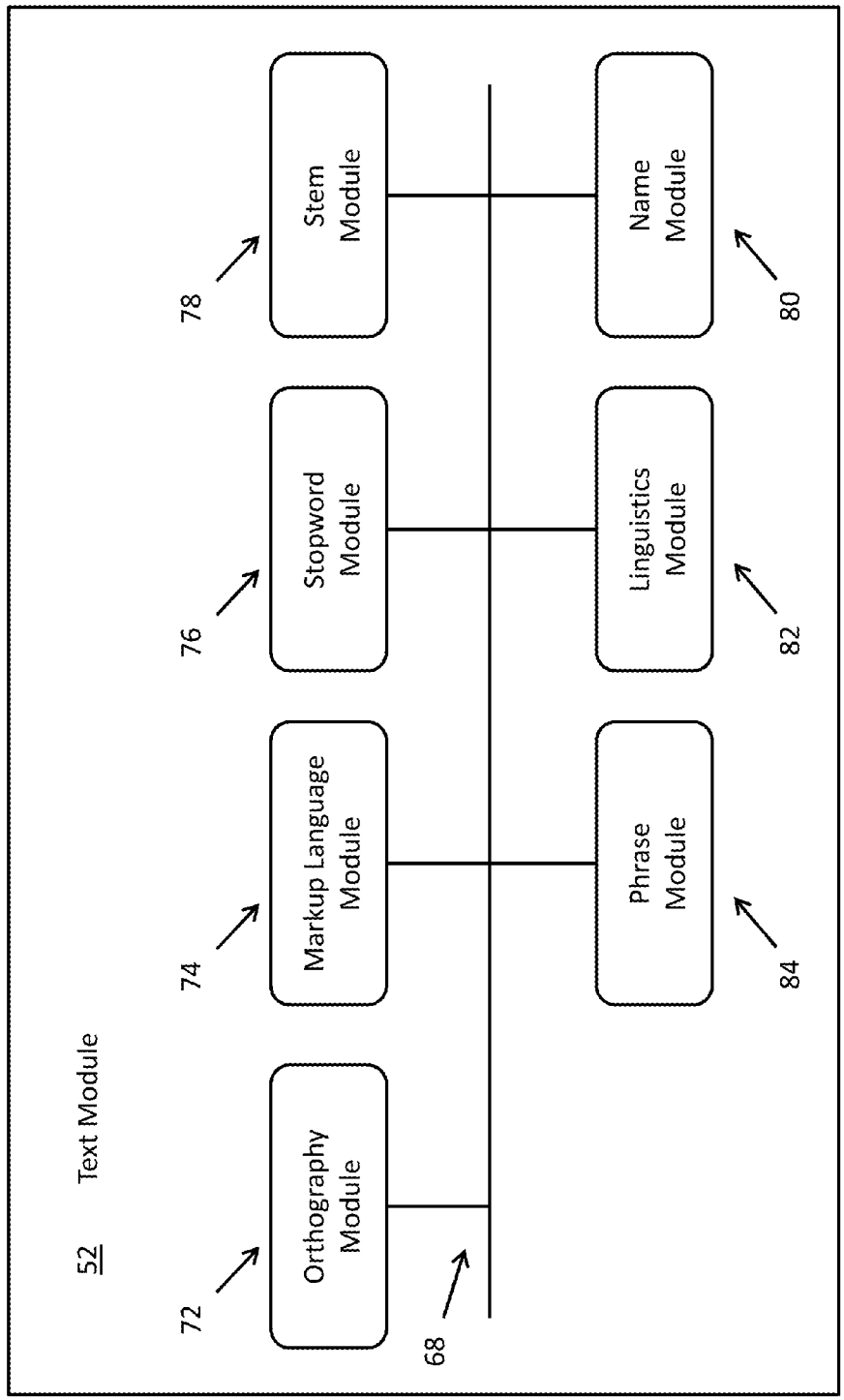
FIG. 5 is a schematic diagram of a text module in accordance with an embodiment of the invention.

Referring to FIG. 5, the text module 52 may include an orthography module 72, a markup language module 74, a stopword module 76, a stem module 78, a name module 80, a linguistics module 82 and a phrase module 84, which may be communicatively interconnected by way of data links 68. For example, the orthography module 72 can be configured to perform word spelling correction, merge plural and singular words, standardize hyphenation, standardize or remove capitalization, word breaks, and punctuation in the discussion or subdiscussion text using any suitable techniques.

For example, an embodiment may implement a lexical database of a natural language, such as Wordnet® for the English language, to combine different forms of words, such as the plural and singular forms. As another example, an embodiment may implement any a dictionary to check and correct, or standardize, the spelling of words, for example, to unify the text to conform to a particular national spelling standard.

The markup language module 74 can be configured to remove programmed markup language from the text data. For example, the markup language module 74 may remove non-substantive hypertext markup language (HTML), extensible markup language (XML), standard generalized markup language (SGML), or any applicable markup language in accordance with any standard or specification.

The stopword module 76 can be configured to remove "stop words," such as common articles, conjunctions, pronouns or verbs from the text data. The stopword module 76 may implement any techniques to identify and remove stop words not considered to add meaningful concepts to the text.

The stem module 78 can be configured to truncate words to a standard form, such as a base, root or stem. For example, the stem module 78 may modify all verb forms to a standard base verb form. The stem module 78 may implement any method for stemming.

The name module 80 can be configured to detect and remove names, such as participant or author names, from the text data. For example, the name module 80 can be configured to receive metadata regarding the discussion or subdiscussion, locate and remove names, for example, regarding person or places.

The linguistics module 82 can be configured to identify the part-of-speech of each word. For example, the linguistics module 82 may identify the grammatical role of word each word in the text data, such as nouns, verbs, adjectives, adverbs, prepositions, or the like.

The phrase module 84 can be configured to detect phrases in the text data. For example the phrase module 84 can be configured to recognize unigrams, bigrams and trigrams, or any other suitable length phrases. The phrase module 84 further can be configured to detect disjoint phrases, in which one or more meaningful terms of the phrase may be separated from other meaningful terms of the phrase by terms that are not part of, or are not meaningful to, the phrase.

The phrase module 84 can be configured to keep certain types of phrases and to remove other types of phrases. For example, in an embodiment the phrase module 84 may keep only nouns, noun phrases, and noun-plus-adjective phrases, and remove all other phrases, such as verb phrases, prepositional phrases, or the like. In general, concept terms may include one or more word, or term, corresponding to a subject. For example, a concept represented by a trigram may include three concept terms.

In an alternative embodiment, a user, such as a subject matter expert, optionally may provide initial input to the phrase module 84, for example, to provide an initial concept dictionary and to identify semantically equivalent words or phrases. In addition, in an embodiment, a user, such as a subject matter expert, may provide subsequent input to the phrase module after automated phrase detection has been performed, to expand upon the identified words and phrases. For example, the user may provide additional related or equivalent concept terms, such as synonyms of the detected words or phrases. Furthermore, in an embodiment, applications or programs may be implemented to determine concept or term equivalence, such as for example, Wordnet®.

Referring again to FIG. 4, the domain filter module 54 can be configured to receive the text data from a discussion, such as, for example, a full virtual discussion. The domain filter module 54 may also be configured to receive the corpus of a background, or generic, text compendium, or the corpora of more than one text compendium. For example, the domain filter module may utilize one or more general corpora, such as the Gutenberg corpus, the Reuters corpus, the Brown University Standard Corpus of Present-Day American English (the Brown corpus), the Corpus of Contemporary American English (COCA), the British National Corpus (BNC), the International Corpus of English (ICE), or an online encyclopedia, such as Wikipedia®. The corpus may include, for example, digitized novels, textbooks and other books for which the copyrights have expired, historical news stories, newspaper editorials, patents, or the like.

The corpus, or corpora, may provide a generic background volume of text data against which the domain filter module 54 may implement statistical tools to compare the discussion or subdiscussion text data. For example, the domain filter module 54 may implement use the relative frequencies of terms in the corpora, along with the relative frequencies of terms in the discussion, or subdiscussion, to compute normalized frequencies for the terms in the discussion, or subdiscussion. The domain filter module 54 may rank, or sort, the terms in the discussion, or subdiscussion, in order of decreasing relative frequency.

Terms with relatively low normalized frequencies may be removed to perform frequency-based filtering of non-domain concepts. The domain filter module 54 may select terms that appear in the discussion or subdiscussion with relatively high normalized frequencies as domain-relevant, or domain, concepts. For example, in various embodiments, the domain filter module 54 may select a predetermined number of terms, such as 10, 50, 100, 500, or any suitable number of terms, with the highest normalized frequencies to create an ordered domain concept list.

In addition, in an embodiment, the text module 52 may use a corpus, or corpora, of background text to identify and remove high-frequency words from the discussion, or subdiscussion. For example, in various embodiments, the text module 52 may remove terms from the discussion, or subdiscussion, that are among the top 1%, 5% or 10% highest frequency terms in a text compendium, such as the Gutenburg corpus.

Furthermore, in an embodiment, a user, such as a subject matter expert, optionally may provide additional refinements to the domain concept list. For example, the user may include concept terms that were removed by the domain filter module 54, or the user may reorder, or resort, some of the domain concepts in the list.

The subdiscussion filter module 56 can be configured to receive the domain concept list, the text data of a subdiscussion and the full text data of the corresponding discussion. The subdiscussion filter module 56 may implement statistical tools to compute the relative frequency of each of the domain concepts in the discussion and in the subdiscussion, and use these to calculate normalized frequencies of the domain concepts in the subdiscussion with respect to the discussion. In an embodiment, the subdiscussion filter module 56 may filter the subdiscussion terms based on the normalized frequencies. For example, in various embodiments, the remove all but the top 10, 50, 500, or any suitable number of subdiscussion terms with the highest normalized frequencies.

The subdiscussion filter module 56 may further compute a term frequency-inverse document frequency (TF-IDF) score for the remaining subdiscussion terms. In an embodiment, the number of "documents" in the IDF score may be the number of subdiscussions. In addition, the subdiscussion filter module 56 may select the remaining subdiscussion terms as subdiscussion-relevant concepts. The subdiscussion filter module 56 may rank, or sort, the subdiscussion-relevant, or subdiscussion, concepts, for example, in order of decreasing TF-IDF scores, to create an ordered subdiscussion concept list.

Further, in an embodiment, a user, such as a subject matter expert, optionally may provide additional refinements to the subdiscussion concept list. For example, the user may include concept terms that were removed by the subdiscussion filter module 56, or the user may reorder, or resort, some of the subdiscussion concepts in the list.

Figure 6:
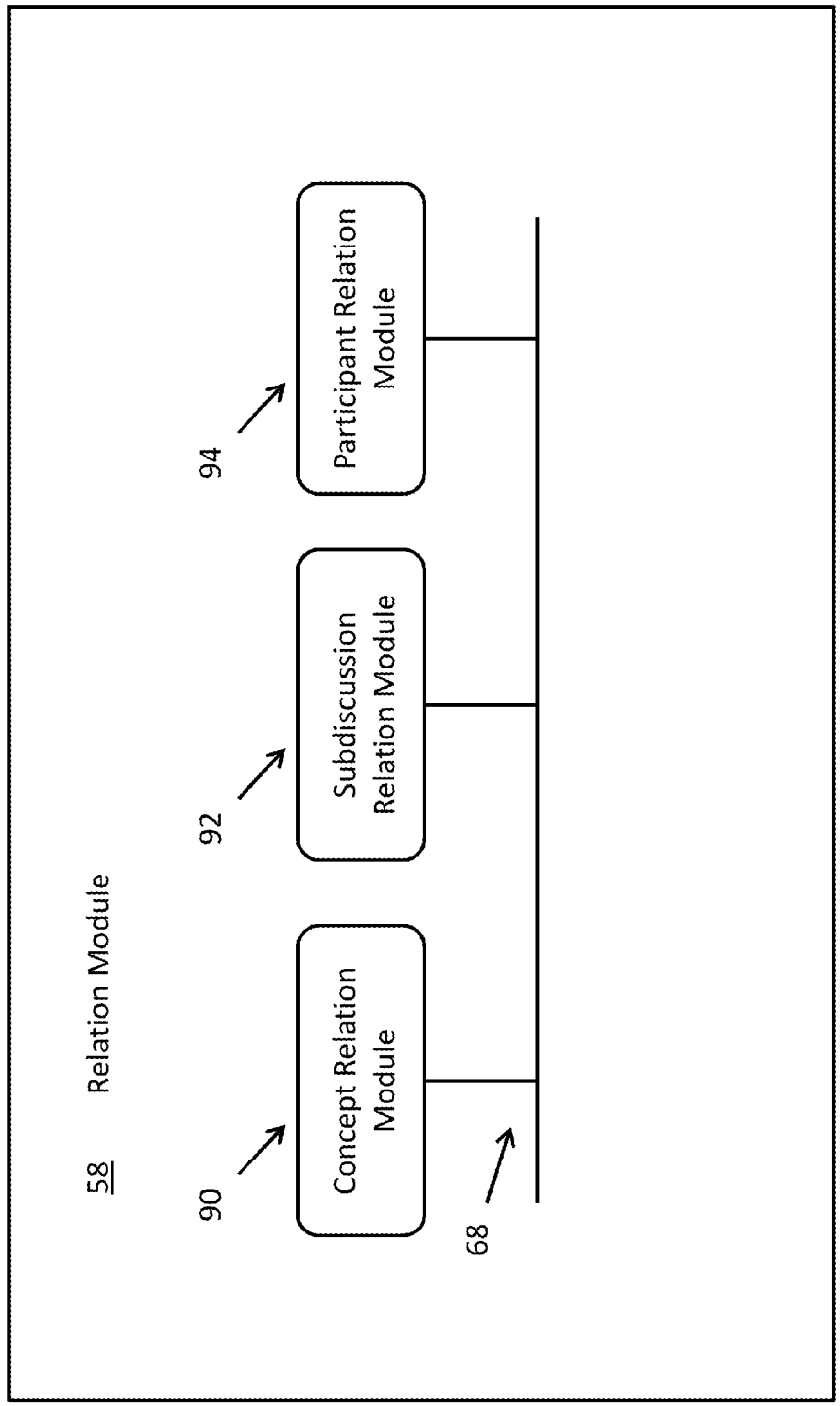
FIG. 6 is a schematic diagram of a relation module in accordance with an embodiment of the invention.

Referring now to FIG. 6, the relation module 58 may include a concept relation module 90, a subdiscussion relation module 92 and a participant relation module 94, which may be communicatively interconnected by way of data links 68. The relation module 58 may identify relations, or relationships, for example, between entities associated with the online discussion, such as concepts, participants, subdiscussions, and the like.

A relationship, or relation, may indicate an association, connection, commonality, similarity or relevance between two or more like entities, such as, for example, between concepts or between participants, or between two or more distinct entities, such as, for example, between a concept and a participant. A relationship, or relation, may have a basis, for example, in some shared aspect, quality, property, interest, or the like.

The concept relation module 90 may identify relations, or relationships between domain concepts or between subdiscussion concepts. In an embodiment, the concept relation module 90 may implement a co-occurrence weight computation to identify concept terms that occur in proximity to one another to determine a relationship exists between the concepts. For example, the concept relation module 90 may determine whether or not terms corresponding to multiple concepts appear within a window of text, such as within a number of words from one another. In various embodiments, for example, the concept relation module 90 may identify concept terms that occur within 25 words, within 50 words, within 100 words, within 500 words, or within any other suitable number of words from each other.

In an embodiment, the concept relation module 90 may determine if multiple concept terms occur within the same subdiscussion, such as within the same thread in an online forum, within the same comment, or in a reply to a comment, or the like. Similarly, the concept relation module 90 may identify concept terms that appear within the same sentence, within the same paragraph, on the same page, in the same user interface window, or the like. In an embodiment, the concept relation module 90 may utilize multiple proximity, or co-occurrence, measures to determine a relation exists between concepts.

In an embodiment, the concept relation module 90 may associate concept tags with a subdiscussion or excerpt, such as a thread, comment or reply. The concept tags may correspond, for example, to the discussion concepts determined to have some relation to the subdiscussion.

Figure 7:
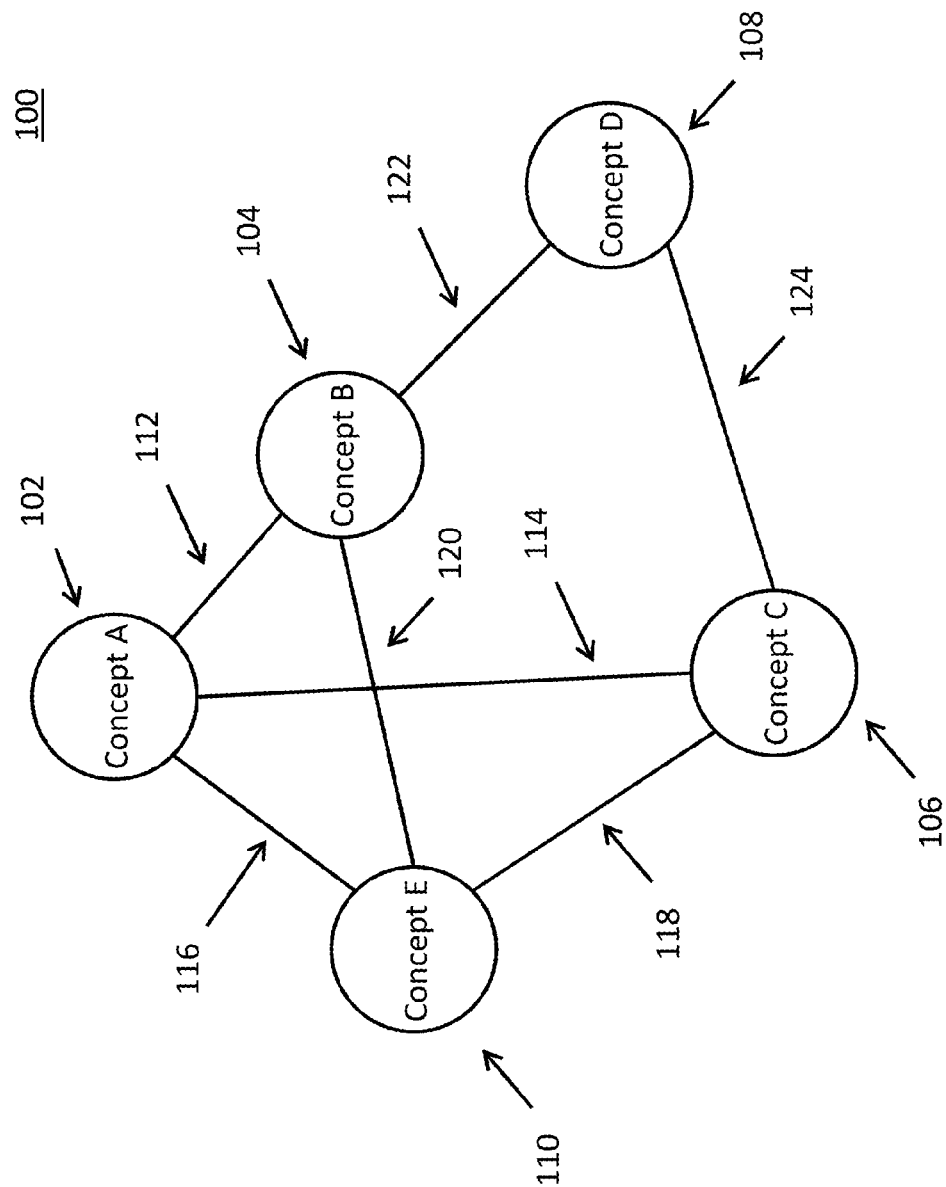
FIG. 7 is a schematic diagram of a concept relation map in accordance with an embodiment of the invention.

The concept relation module 90 may organize the concepts and the corresponding relations between concepts in a relation map, such as the concept relationship map 100 shown in FIG. 7. In this exemplary relational map, five key concepts, or themes, have been identified corresponding to a discussion or subdiscussion, as represented by the nodes in the concept relationship map 100, Concept A 102, Concept B 104, Concept C 106, Concept D 108 and Concept E 110. The relationships between the concepts may be depicted, for example, by lines between the concept nodes, such as Relation AB 112 between Concept A 102 and Concept B 104, Relation AC 114 between Concept A 101 and Concept C 1106, Relation AE 116 between Concept A 102 and Concept E 110, Relation CE 118 between Concept C 106 and Concept E 110, Relation BE 120 between Concept B 104 and Concept E 110, Relation BD 122 between Concept B 104 and Concept D 108, and Relation CD 124 between Concept C 106 and Concept D 108.

In an embodiment, the concept relation module 90 may create a detailed hierarchical relation map in which each node may represent a discussion concept or a subdiscussion concept and may be labeled with a concept tag. In an embodiment, the size, color or shape of each node may represent characteristics of the concept, such as the total number of appearances of the concept throughout the discussion, the number of appearances of the concept in a subdiscussion, the relevance of the concept to the discussion or to a subdiscussion, the type of concept, or the like. Similarly, in an embodiment, the width of the relationship lines may reflect the strength of the correlation, or relation, between nodes.

Figure 8:
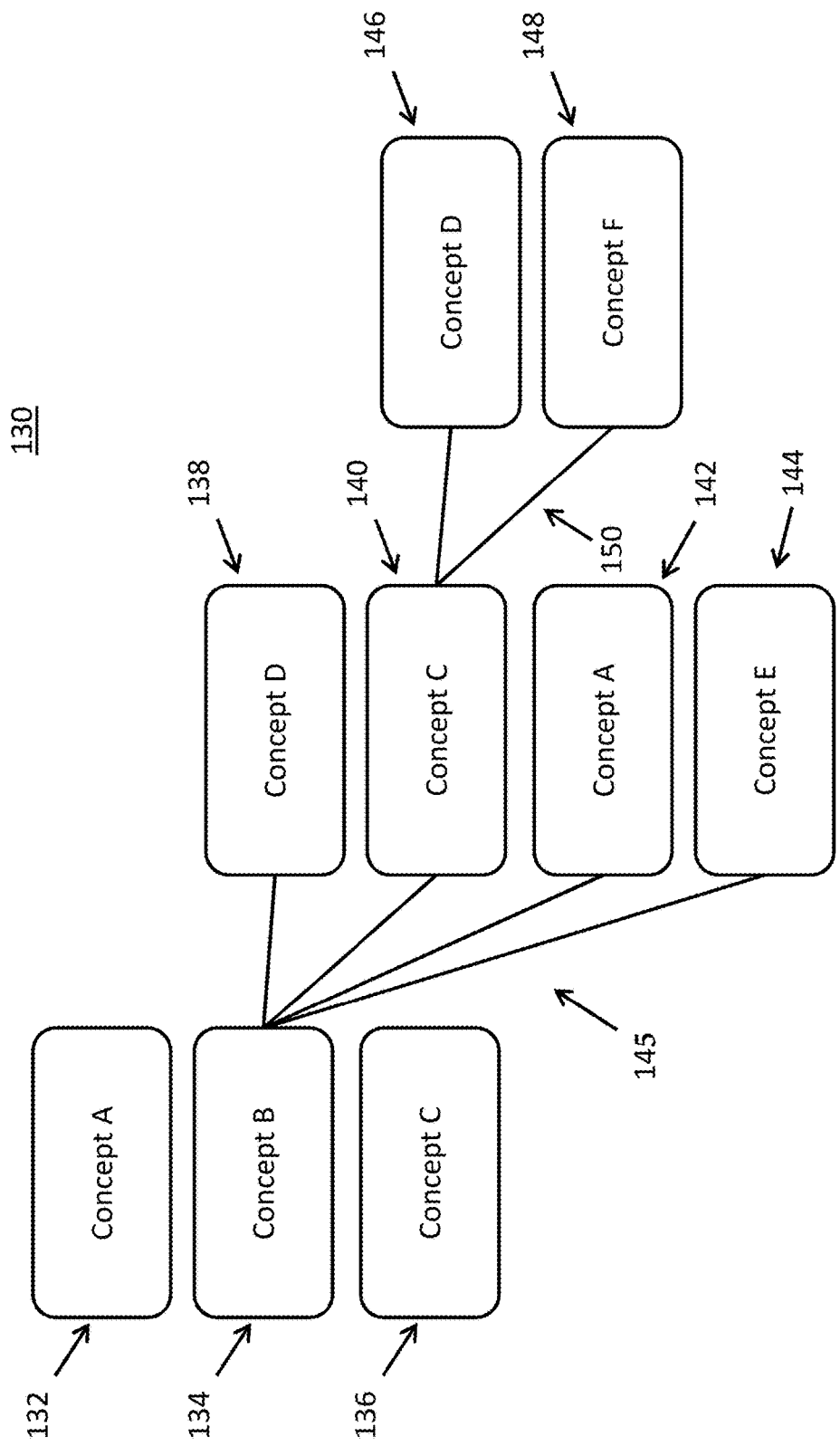
FIG. 8 is a schematic diagram of a concept hierarchy in accordance with an embodiment of the invention.

In an embodiment, the concept relation module 90 may further organize a hierarchy of concepts of a discussion or subdiscussion based on the corresponding relations, such as the three-level concept hierarchy 130 illustrated in FIG. 8. For example, the concept relation module 90 may select a number of the top-ranked concepts from a discussion or subdiscussion as the first level of a hierarchy. In the exemplary concept hierarchy 130, the top level of the hierarchy at the left of FIG. 8 includes the three top-ranked concepts, Concept A 132, Concept B 134, and Concept C 136.

In the exemplary concept hierarchy 130, the second level of the hierarchy is based on relations regarding the second top-level concept, Concept B 134. In an exemplary embodiment, the strength of the relations is a function of the number of times that the first and second concept co-occur within the same subdiscussion, or within the same comment, or within the same sentence, or in a common window of words, of within a multiple comments and/or replies. It will be understood that in various instances the second level of the hierarchy may equally be based on relations to another of the top-level concepts. The exemplary second level of the hierarchy includes the four concepts with the strongest correlation, or relation, to Concept B 134, that is, Concept D 138, Concept C 140, Concept A 142, and Concept E 144. The relationships between the top-level concept, Concept B 134, and each of the second level concepts 138, 140, 142, 144 are shown by lines 145 connecting the top level concept, Concept B 134, with the related second-level concepts 138, 140, 142, 144.

Further, in the exemplary concept hierarchy 130, the third level of the hierarchy is based on relations regarding the second second-level concept, Concept C 140 and the first level concept, Concept B 134. In an exemplary embodiment, the strength of the relations is a function of the number of times that the first, second and third concepts co-occur within the same subdiscussion, within the same comment, within the same sentence, in a common window of words, or within multiple comments and/or replies. It will be understood that in various instances the third level of the hierarchy could equally be based on relations to another of the second-level concepts. The exemplary third level of the hierarchy includes the two concepts with the strongest correlation, or relation, to Concept C 140 and concept B 134, that is, Concept D 146 and Concept F 148. Of course, a person of ordinary skill in the art will readily apprehend that in various embodiments any number of concepts may be included in each level, and any number of levels may be included in the hierarchy.

Referring again to FIG. 6, the subdiscussion relation module 92 can be configured to identify relations, or relationships, between subdiscussions. For example, the subdiscussion relation module 92 may receive the text from multiple subdiscussions and measure the relatedness of the subdiscussion. In an embodiment, the subdiscussion relation module 92 may determine a score regarding the significance, or relevance, of each concept identified in each subdiscussion. For example, the score may be computed using the normalized frequency, the TF-IDF, a combination of these, or the like, for each concept in each subdiscussion.

The subdiscussion relation module 92 may include a score for each concept of a subdiscussion in a vector that represents the subdiscussion. As a specific example, suppose the scores for three concepts in two exemplary subdiscussions are the following:

| Concept | Subdiscussion 1 | Subdiscussion 2 |
|---------|-----------------|-----------------|
| A | 0.2 | 0.3 |
| B | 0.1 | 0.2 |
| C | 0.0 | 0.1 |

In this example, the following vectors may represent the two subdiscussions:

| Subdiscussion | Vector |
|---------------|--------|
| 1 | (0.3, 0.2, 0.1) |
| 2 | (0.2, 0.1, 0.0) |

The subdiscussion relation module 92 may compare the vectors to determine the similarity between the vectors. For example, the subdiscussion relation module 92 may calculate the cosine between the two vectors, perform a non-negative matrix factorization (NNMF) algorithm, or any other suitable algorithm, as a measure of the similarity of the vectors. In an embodiment, the subdiscussion relation module 92 may select pairs of concepts with relatively high measures of similarity as related concepts. In an embodiment, the subdiscussion relation module 92 may form clusters of subdiscussions based on one or more measures of similarity, or commonality.

Figure 9:
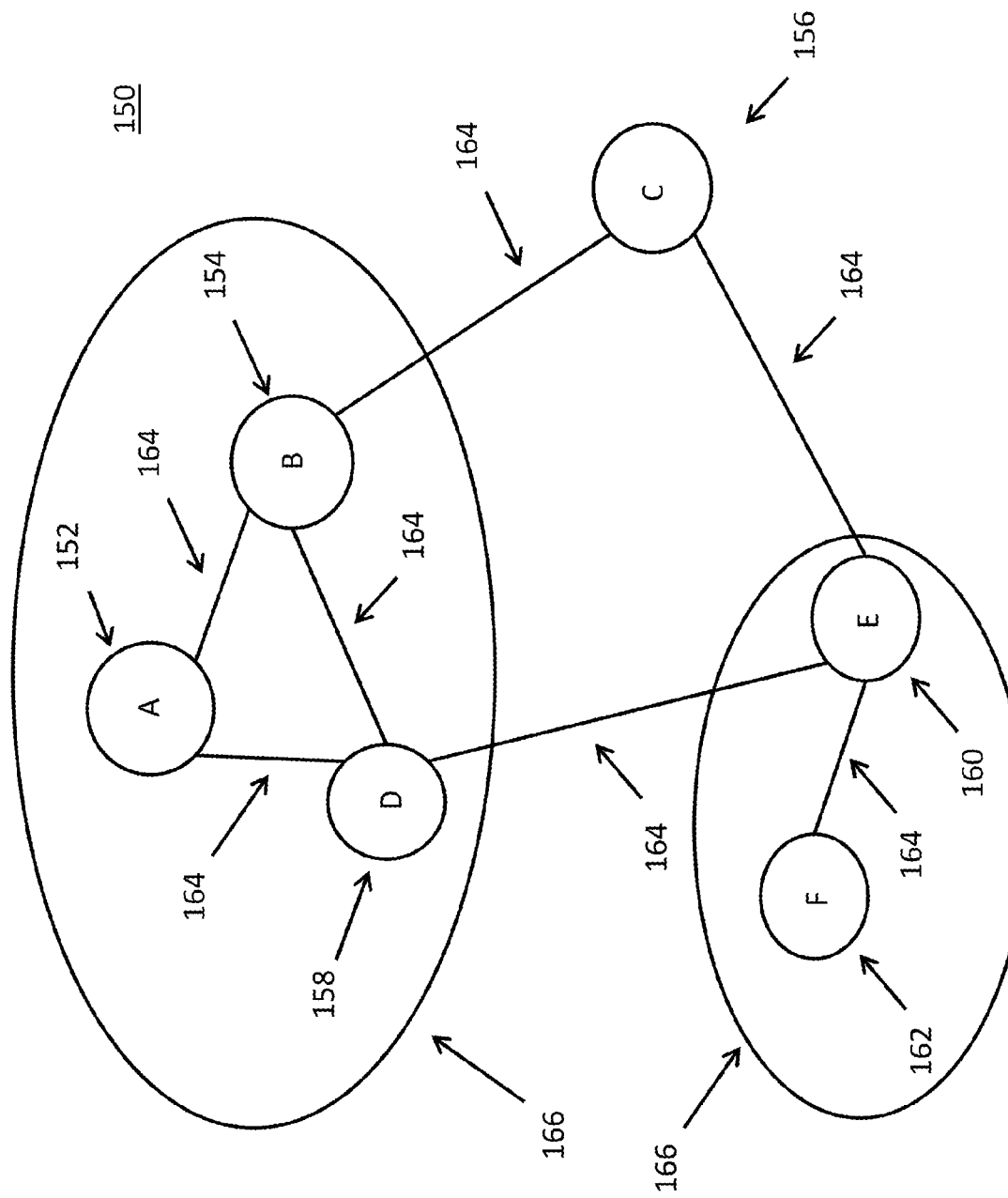
FIG. 9 is a schematic diagram of a subdiscussion map in accordance with an embodiment of the invention.

The subdiscussion relation module 92 may organize a relational map illustrating the subdiscussion relations and clusters, such as the subdiscussion relationship map 150 shown in FIG. 9. For example, subdiscussions A 152, B 154, C 156, D 158, E 160 and F 162 may be depicted as nodes in the subdiscussion relationship map 150. The corresponding subdiscussion relations 164 may be illustrated by lines connecting the corresponding subdiscussions 152, 154, 156, 158, 160, 162. In this example, the subdiscussion relation module 92 has grouped subdiscussions A 152, B 154 and D 158 into subdiscussion clusters 166 based on commonalities among the related subdiscussion concepts. Similarly, the subdiscussion relation module 92 has grouped subdiscussions E 160 and F 162 into an additional subdiscussion cluster 166 of topics, or concepts.

Referring once again to FIG. 6, the participant relation module 94 can be configured to identify relations, or relationships, between participants of a discussion, or of a subdiscussion. For example, the participant relation module 94 may receive participant response data and optionally group the participants into participant groups, classes or sets. In various embodiments, the participant groups may corresponds to project teams, departments, companies, other organizational entities, or any other meaningful groupings of participants. In an embodiment, the participant groupings may be further refined by input from a user, such as a subject matter expert.

The participant relation module 94 may create a multidimensional response matrix that represents a discussion, or subdiscussion, based on the participation of participant groups or individual participants. For example, in an embodiment the response matrix may represent the number of times a particular group or participant responded to another group or participant in the online discussion. In an embodiment, the response matrix may represent the number of times particular groups or participants contributed to a common subdiscussion, such as a thread in an online forum.

The participant relation module 94 may also create a multidimensional content matrix the represents a discussion, or subdiscussion, based on the commonality of content provided by particular participant groups or individual participants. For example, the participant relation module 94 may create a vector of themes, or concepts, representing the contribution of each group or participant and compute content-wise comparison of the participant or group contributions. In an embodiment, the content matrix may represent the similarities of the contributions by a particular group or participant with respect to the contributions by another group or participant. In an embodiment, the similarities in discussion text may be biased, for example, by the extracted concepts.

The participant relation module 94 may cluster, or group together, individual participants or participant groups that appear to be interested in the same or similar themes. For example, the participant relation module 94 may perform a clustering algorithm, such as a non-negative matrix factorization (NNMF) algorithm, a k-means algorithm, or any other suitable clustering algorithm. In an exemplary embodiment, a linear combination of the response and the concept matrix is formed and is used by the clustering algorithm to form the participant clusters.

Figure 10:
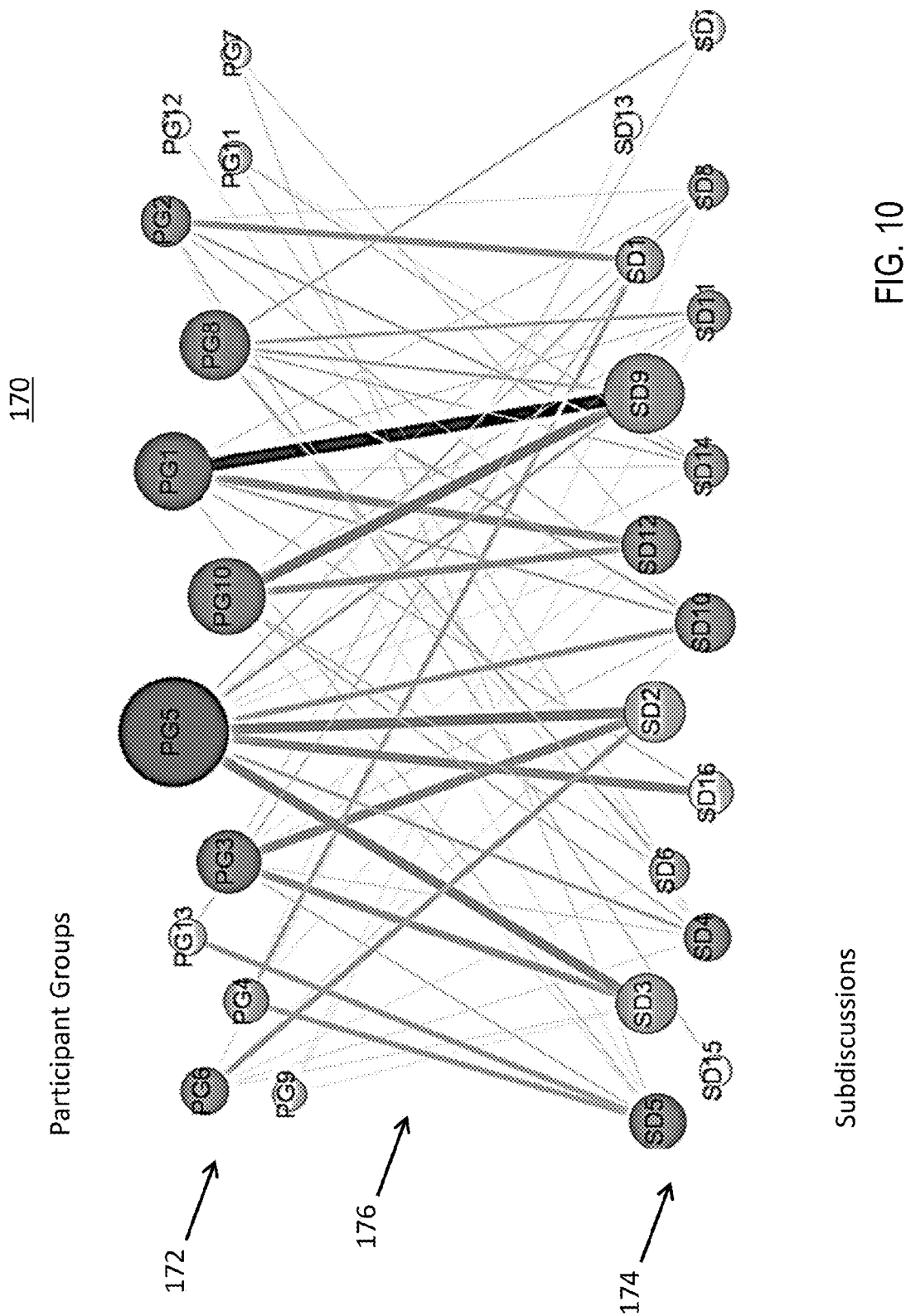
FIG. 10 is a schematic diagram of a participant-subdiscussion relationship map in accordance with an embodiment of the invention.

The participant relation module 94 may organize a bipartite map illustrating the relations between the participants and the subdiscussions, such as the participant-subdiscussion relationship map 170 shown in FIG. 10. For example, the participant relation module 94 may create a bipartite graph showing participant nodes 172, such as participant groups or individual participants, along one edge and subdiscussion nodes 174, such as threads of an online forum, along the opposite edge. The participant-subdiscussion relations 176 between particular participants and subdiscussions may be illustrated by lines connecting the participant nodes 172 with subdiscussion nodes 174.

In an embodiment, the participant node size may reflect the number or frequency of contributions made to the discussion by a particular participant. Similarly, in an embodiment, subdiscussion node color or shape may represent diversity, or the number of topics or concepts in a subdiscussion. The participant-subdiscussion relationship map 170, or bipartite graph, may aid a user in identifying and characterizing participant internist in subdiscussion.

Figure 11:
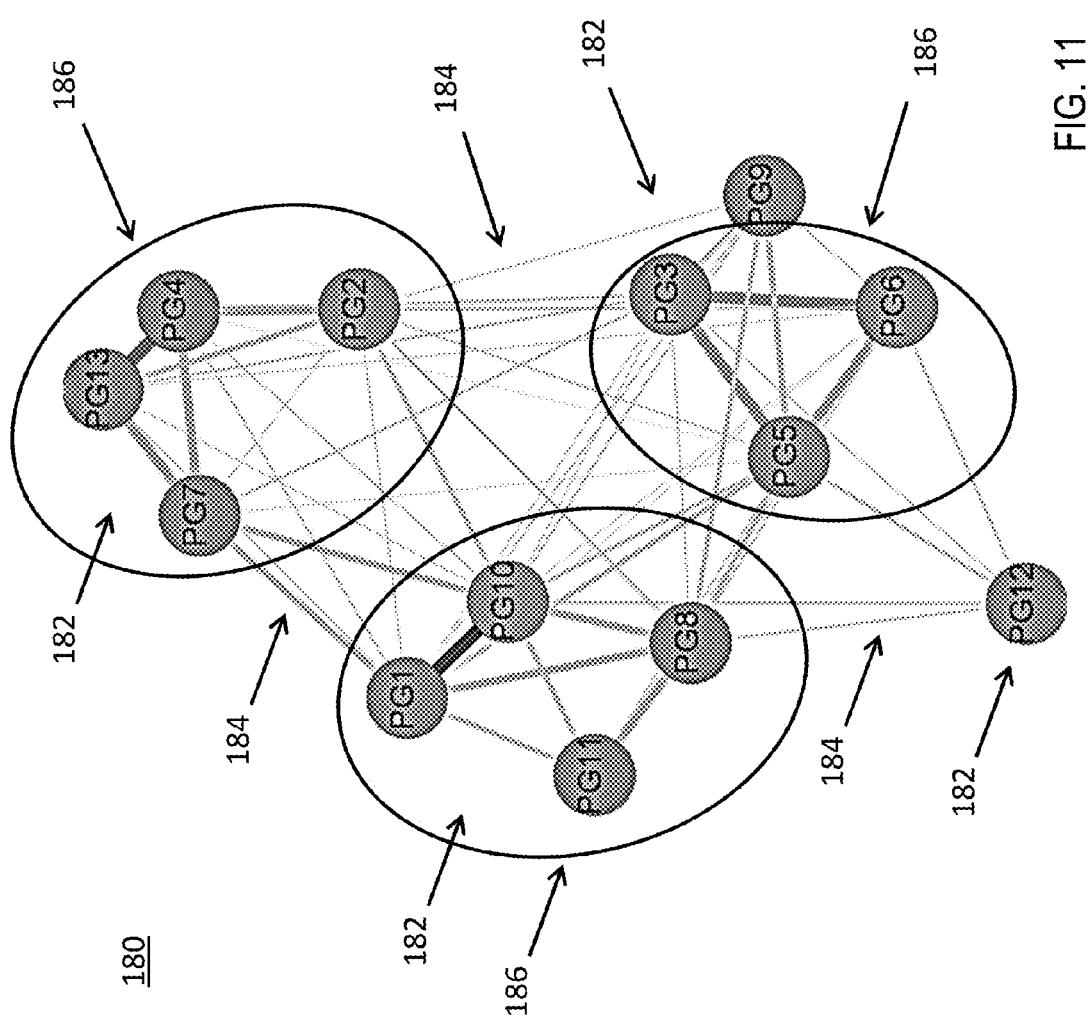
FIG. 11 is a schematic diagram of a participant relationship map in accordance with an embodiment of the invention.

The participant relation module 94 may also organize a relational map illustrating the participant relations and clusters, such as the participant relationship map 180 shown in FIG. 11. For example, the participant relation module 94 may create a relational map of participant nodes 182 and participant relations 184. The participant nodes 182 may be grouped into clusters 186 of participant nodes 182 having similar interests. In an embodiment, the weighting of the participant relations 184 may reflect the number or strength of interactions between the corresponding participant groups or individual participants. The participant-subdiscussion relationship map 170 of FIG. 10 and the participant relationship map 180 of FIG. 11 together may facilitate user identification of participant groups or individual participants that may be linked by common interests.

Figure 4:
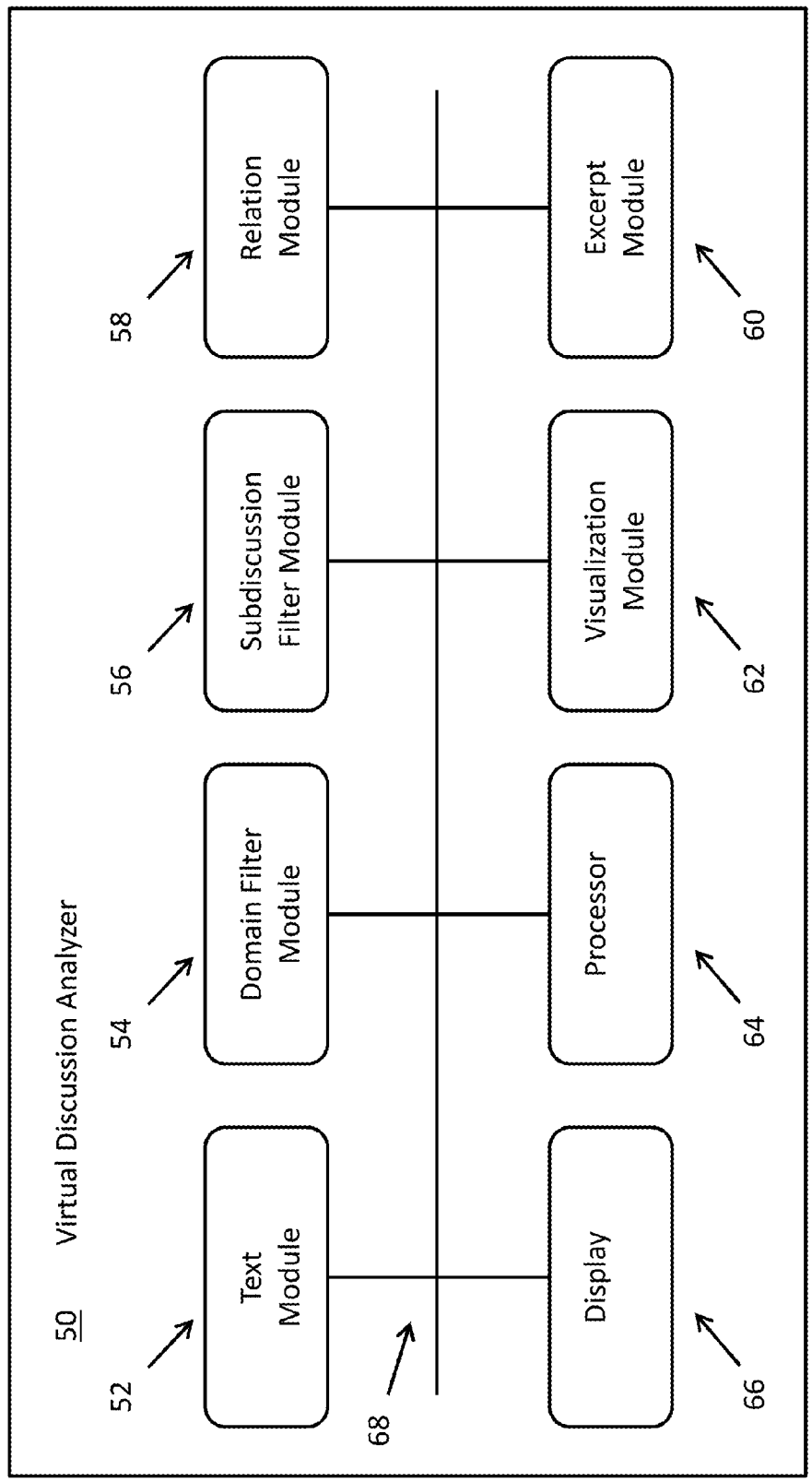
FIG. 4 is a schematic diagram of a virtual discussion analyzer in accordance with an embodiment of the invention.
Figure 12:
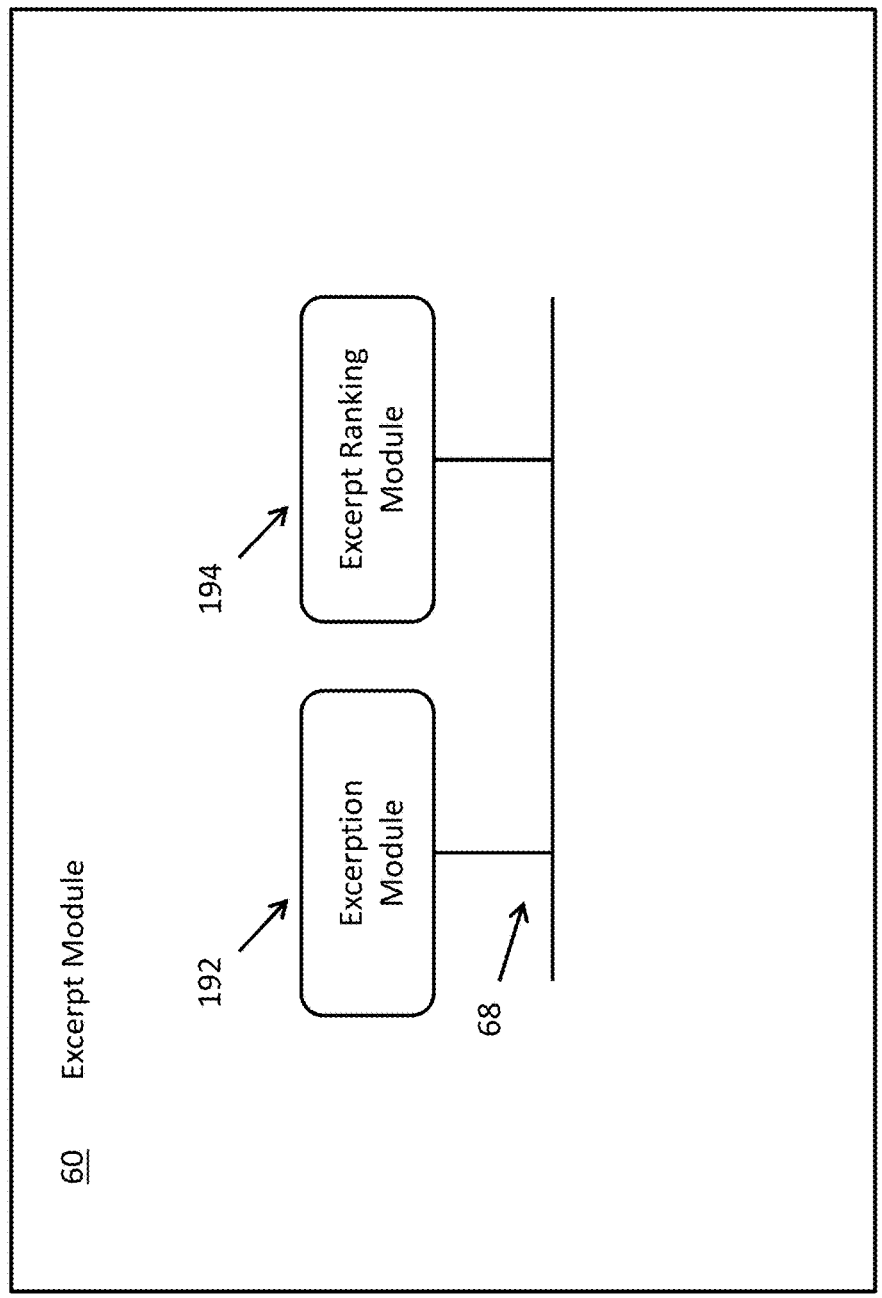
FIG. 12 is a schematic diagram of a participant relationship map in accordance with an embodiment of the invention.

Referring now to FIG. 12, the excerpt module 60 of FIG. 4 may include an excerption module 192 and an excerpt ranking module 194, which may be communicatively interconnected by way of data links 68. The excerption module 192 can be configured to extract textual segments, or excerpts, from the online discussion based on the relevance of the excerpts to discussion concepts, or to subdiscussion concepts. For example, the excerption module 192 can be configured to generate a query to search throughout the online discussion for one or more of the concept terms appearing within a window of text.

In various embodiments, the excerption module 192 may search for concept terms that occur, for example, within a window of 10 words, 25 words, 50 words, 100 words, or any other suitable length window of words. An embodiment may implement any suitable information retrieval application, or search engine, such as the SrndQuery function of the Lucene™ open-source search software package by Apache Software Foundation.

The excerption module 192 may select the query results having the highest relevance to the discussion as excerpts, at least one of which may be presented to a user. For example, the excerption module may select the excerpts having the highest number of occurrences of concept terms. The excerption module 192 can be configured to select up to a preset number of excerpts. In various embodiments the excerption module 192 may select a single excerpt, up to 3 excerpts, up to 5 excerpts, up to 10 excerpts, up to 25 excerpts or any useful number of excerpts.

The excerpt ranking module 194 can be configured to rank, or sort, the selected excerpts based on relevance to the online discussion. For example, the excerpt ranking module 194 may assign an initial, or preliminary, ranking based on scores corresponding to each excerpt received from the information retrieval application. The scores may be based, for example, on the number of occurrences of concept terms in the excerpts. The results of the ranking may be used to determine which excerpts may be presented to the user, as well as the order in which the excerpts may be presented.

Figure 13:
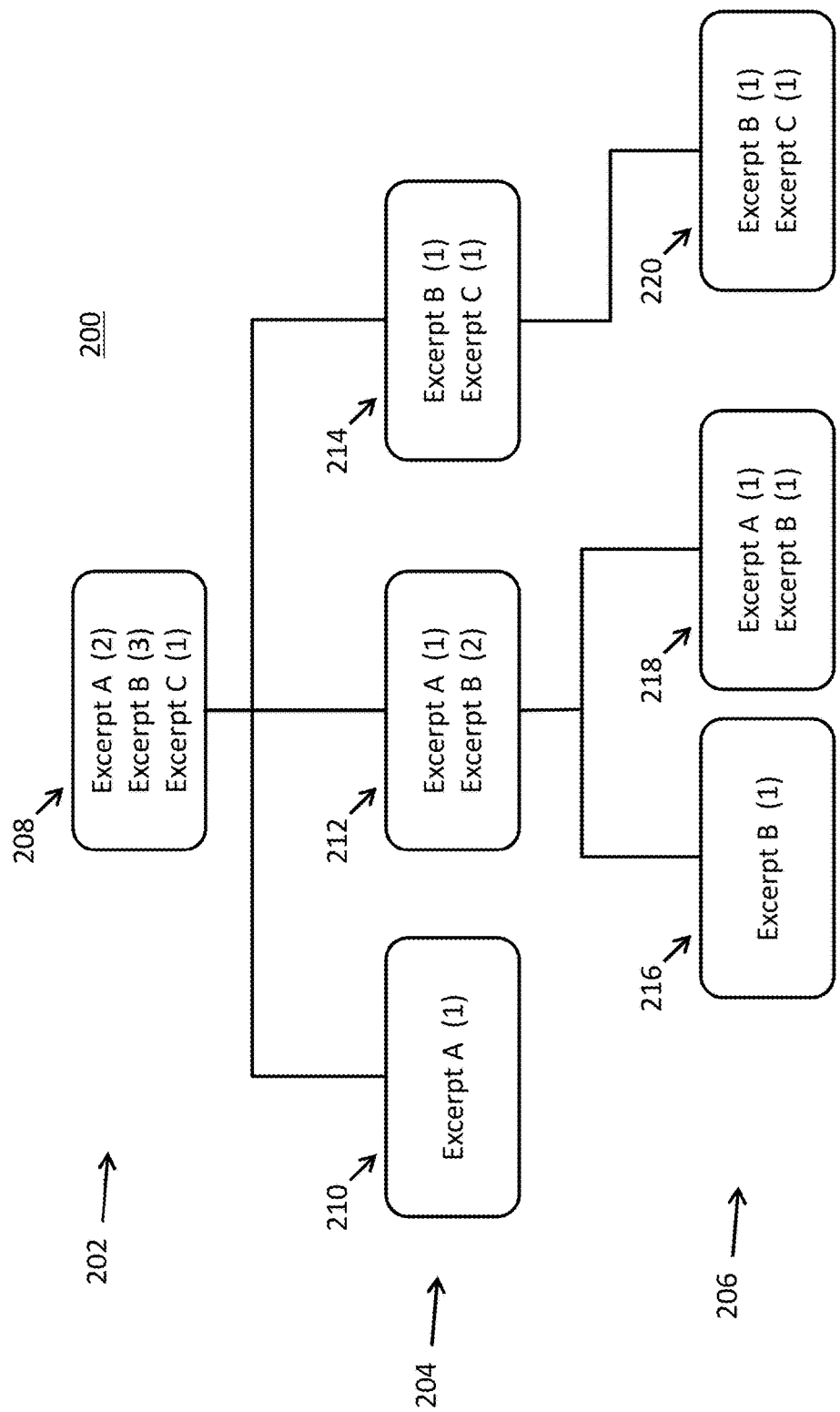
FIG. 13 is a schematic diagram of a ranking hierarchy in accordance with an embodiment of the invention.

In an embodiment, the excerpt ranking module 194 may create a ranking hierarchy of query returns with respect to excerpts, such as the exemplary ranking hierarchy 200 illustrated in FIG. 13. For example, the top level 202 of the ranking hierarchy may be based on query returns based on a single concept term, the second level 204 may be based on query returns including the concept term of the top level plus an additional concept term, and the third level 206 may be based on query returns including the concept terms of top level and the second level plus a third concept term.

The excerpt ranking module 194 may augment the score for each excerpt at each increasing level (shown to the right of each excerpt name in FIG. 13) based on the aggregate scores of the occurrences of the same excerpt on the same branch of the hierarchy at the next lower level. For example, in the ranking hierarchy 200 the score for Excerpt B at block 212 (at the second level 204) is increased to "2" based on the aggregate scores for Excerpt B at the next lower level (the third level 206) at block 216 and at block 218. At the top level 202, the score for Excerpt B at block 208 is increased to "3" based on the scores of Excerpt B at the next lower level (the second level 204) at block 212 and at block 214.

Of course, a person of ordinary skill in the art will readily apprehend that in an embodiment the top level may be based on query results including more than one concept term, and the successive levels may be based on query results returning additional concept terms. In various embodiments, any appropriate number of levels may be included according to the number of queried concept terms. In an embodiment, the ranking hierarchy may correspond to a hierarchy of concepts organized by the concept relation module 90, such as the concept hierarchy 130 of FIG. 8. In an embodiment, the excerpt ranking module 194 may sort the excerpts based on votes or "likes" received by each excerpt from participants in social media. In an alternative embodiment, the scores may reflect the number of concept term occurrences at lower levels of the branch, but may be computed using any suitable algorithm, that is, other than the aggregate scores at the next lower level.

Referring again to FIG. 4, the visualization module 62 may provide a graphical user interface for presentation to a user on a display device, such as display 66. For example, the visualization module 62 may provide a graphical user interface representation of the concept relationship map 100 of FIG. 7 to aid a user in understanding the relations between the concepts in a discussion or subdiscussion, and to facilitate the inference of high-level insights regarding the relationships. Similarly, in various embodiments, the visualization module 62 may provide graphical user interface representations of the concept hierarchy 130 of FIG. 8, the subdiscussion relationship map 150 of FIG. 9, the participant-subdiscussion relationship map 170 of FIG. 10, or the participant relationship map 180 of FIG. 11.

Figure 14:
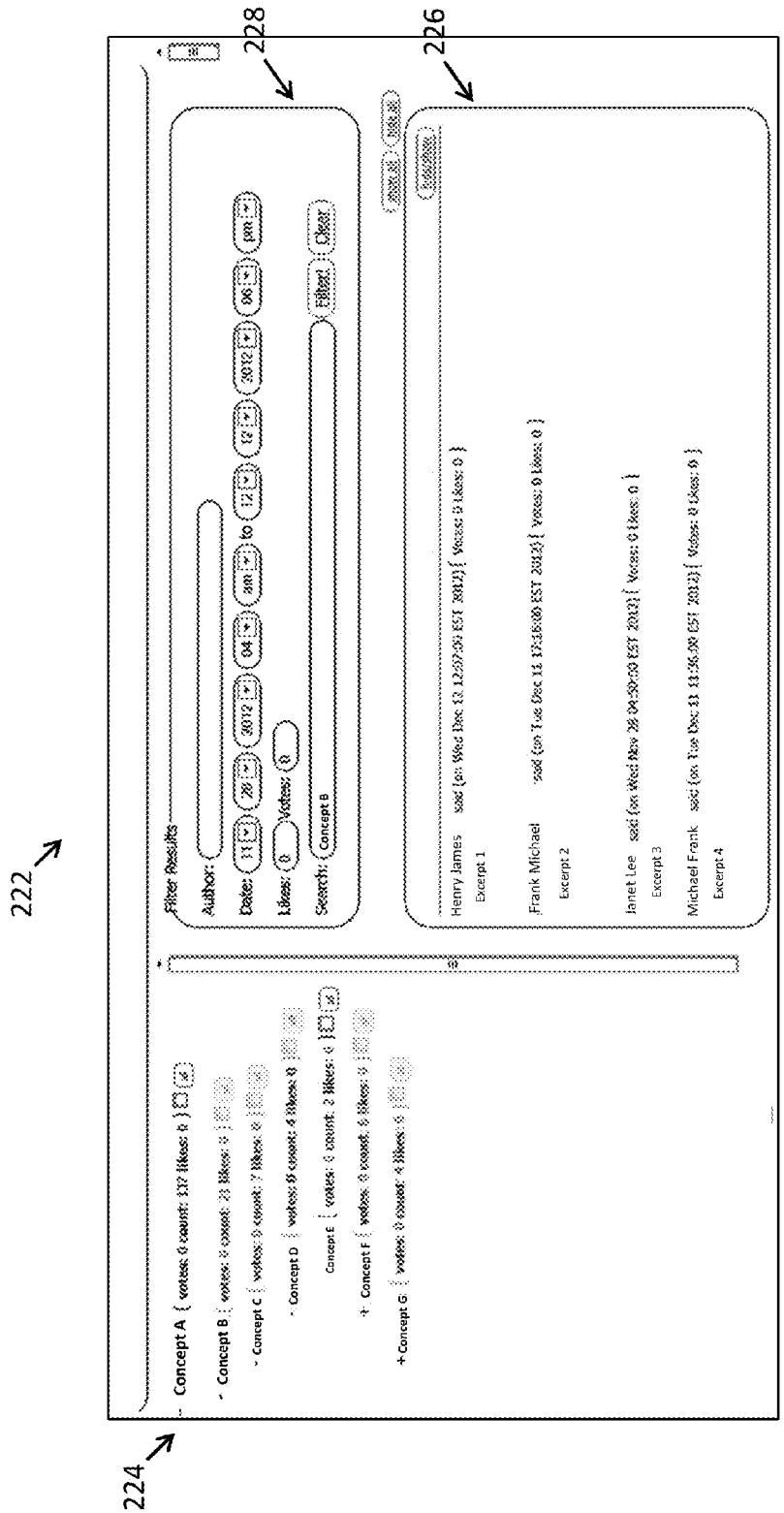
FIG. 14 is an illustration of a discussion display window in accordance with an embodiment of the invention.

In an embodiment, the visualization module 62 may provide a graphical user interface representation of the concept hierarchy organized by the concept relation module 90 in one frame of a display window, along with a representation of excerpts extracted by the excerpt module 60 in another frame of the display window. For example, the visualization module 63 may present the discussion display window 222 shown in FIG. 14. The concept hierarchy organized by the concept relation module 90 of FIG. 6 may be presented in a concept frame 224 in one portion of the window, for example, at the left side of the discussion display window 222. The excerpts selected and sorted by the excerpt module 60 of FIG. 4 may be presented in an excerpt frame 226 in another portion of the window, for example, at the right side of the window discussion display window 222.

In an embodiment, the concept frame 224 may provide the user with the option of showing or hiding each branch or sub-branch of the hierarchy of concepts, so the user may drill down to any desired level of generality or detail. In an embodiment, the user may optionally select any concept term, at the top level of the concept hierarchy or at any lower level of any branch or sub-branch of the concept hierarchy, to view the excerpts corresponding to the selected concept term in the excerpt frame 226.

In an embodiment, the visualization module 62 may provide an excerpt filter frame 228. The excerpt filter frame 228 may provide the user various filtering options, for example, based on the excerpt author, the excerpt date, or one or more search terms. The excerpt filter fame 228 may interface with the excerpt module 60 to provide interactive modification of the viewed excerpts based on user input.

In an embodiment, the visualization module 62 may provide a graphical user interface representation of the concept tags associated with a subdiscussion or an excerpt. The graphical user interface representations may facilitate user understanding of the relations between the concepts, subdiscussions and participants.

Figure 15:
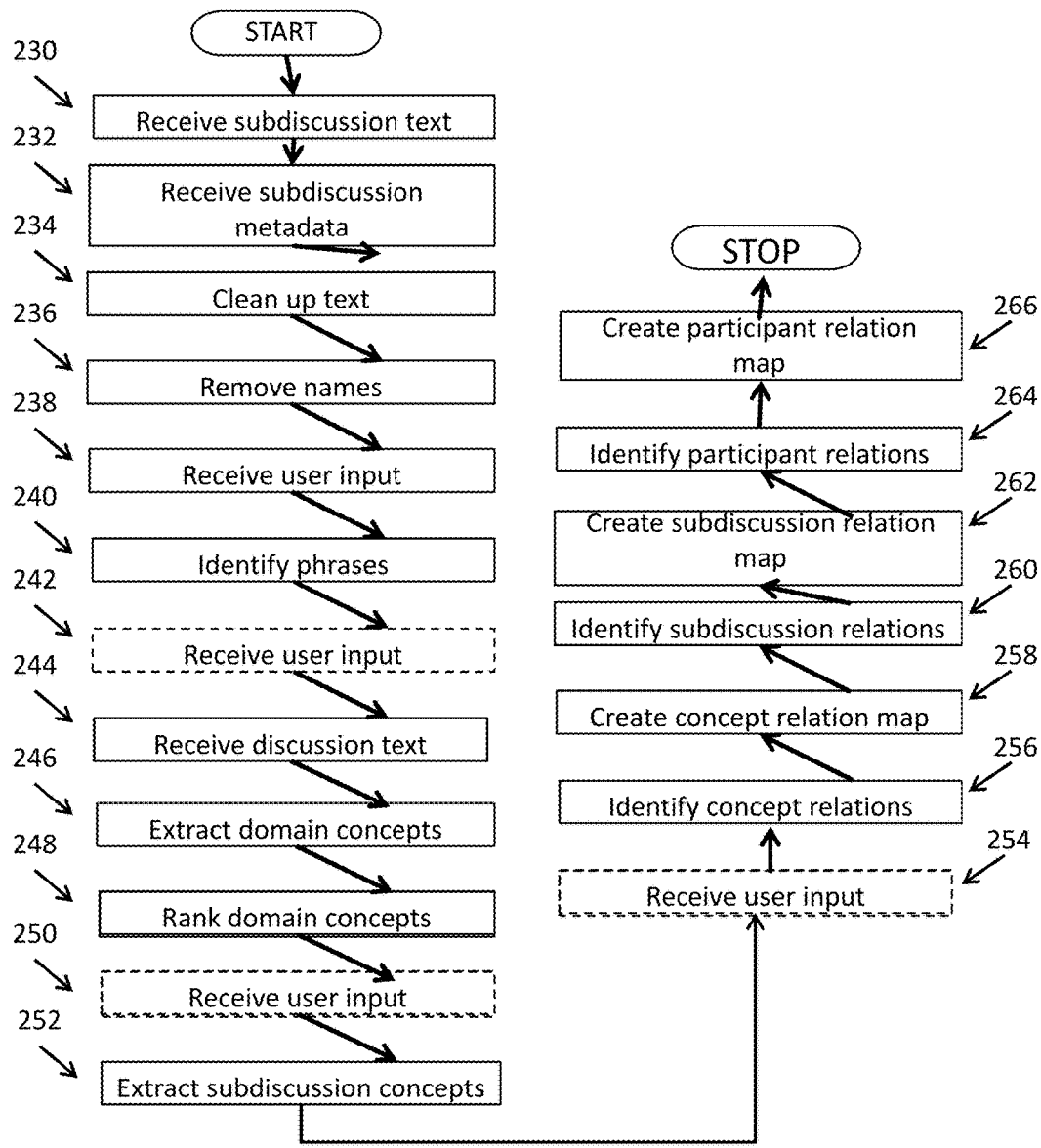
FIG. 15 is a flow diagram that outlines a method for analyzing a virtual discussion in accordance with an embodiment of the invention.

Referring now to FIG. 15, a method for analyzing a virtual discussion in accordance with an embodiment is generally shown. The method may be performed, for example, by the virtual discussion analyzer 50 or FIG. 4. In block 230, the text data from a subdiscussion, such as a thread from an online discussion, may be received. In block 232, metadata associated with the subdiscussion may be received. The subdiscussion text may be cleaned up in block 234. For example, the spelling may be corrected to conform to a spelling standard, stop words may be removed from the text, and word stemming may be performed.

In block 236, author names may be removed from the text, for example, based on the metadata. User input may be received in block 238, including, for example, initial concept dictionary terms from a subject matter expert. Phrases, including unigrams, bigrams and trigrams, may be identified in block 240. Optionally, additional user input may be received in block 242, for example, concept expansion provided by a subject matter expert. In block 244, the full text from a corresponding online discussion may be received. In block 246, main themes, or concepts, may be extracted from the text using statistical tools. The concepts may be ranked, or sorted, by relevance to the discussion in block 248. A user, such as a subject matter expert, optionally may provide input to further refine the ranked concept list in block 250.

In block 252, concepts may be extracted from the subdiscussion, for example, implementing statistical tools to analyze the subdiscussion text. In block 254, additional user input may optionally be received to refine the subdiscussion concept list. Relations between concepts may be identified in block 256, and a concept relation map may be created in block 258. Relations between subdiscussions may be identified in block 260, and a subdiscussion relation map may be created in block 262. Relations between participants may be identified in block 264, and a participant relation map may be created in block 266.

Figure 16:
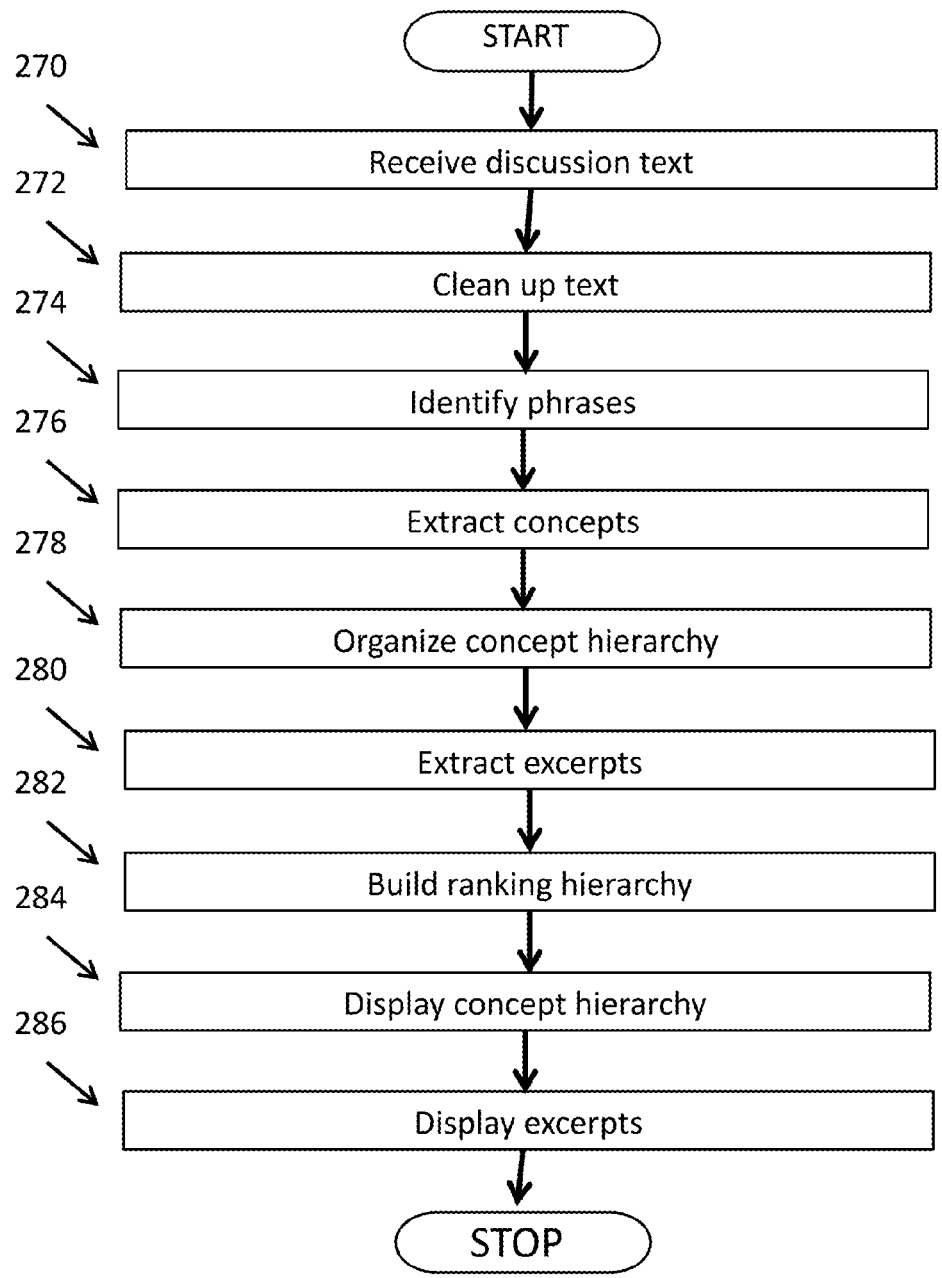
FIG. 16 is a flow diagram that outlines a method for analyzing a virtual discussion in accordance with an embodiment of the invention.

Referring now to FIG. 16, a method for analyzing a virtual discussion in accordance with an embodiment is generally shown. The method may be performed, for example, by the virtual discussion analyzer 50 or FIG. 4. In block 270, the text data from a subdiscussion, such as a thread from an online discussion, may be received. The subdiscussion text may be cleaned up in block 272. For example, the spelling may be corrected to conform to a spelling standard, stop words may be removed from the text, and word stemming may be performed.

Bigram phrases may be identified in block 274. In block 276, concepts may be extracted from the discussion text using statistical tools, including, for example, a question term frequency-inverse question frequency algorithm. In block 278, the concepts may be ranked by relevance to the discussion and organized into a concept hierarchy. Excerpts containing concept terms may be extracted from the text in block 280. In block 282, a ranking hierarchy of the excerpts may be constructed. In block 284, the concept hierarchy may be displayed in one frame of a graphical user interface window, and excerpts corresponding to a selected concept may be displayed in another frame of the window in block 286.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

For example, adding aspects or embodiments of the present invention to general purpose computer, special purpose computer, or other programmable data processing apparatus would improve upon such a computer/apparatus so as to provide the technical effects and benefits of identifying features between multiple subdiscussions and participants to support presenting concepts and relationships in a useful format. The technical effects and benefits also includes providing succinct, meaningful overviews of online discussions; enabling discussion analytics to extract insights about online discussions; and enabling the extraction and analysis of information from large social discussion repositories to provide discussion summaries and insights. The technical effects and benefits further include automated or semiautomated identification of domain-specific concepts in online discussions, determinations of relationships between subdiscussions using concept commonality measures, and inferences of high-level insights from online discussions. Thus, the improved computer/apparatus can aid a discussion manager in making inferences regarding multiple subdiscussions in an online discussion.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for identifying features including relevance within an online discussion, comprising a processor and a memory:
    the processor being configured to execute:
    a subdiscussion filter module configured to identify a first domain-specific concept relevant to a first subdiscussion associated with the online discussion and a second domain-specific concept relevant to the first subdiscussion to support presenting the first and second domain-specific concepts in a format; and
    a concept relation module configured to perform control operations to determine a first relation between the first domain-specific concept and the second domain-specific concept to support presenting the first relation in the format that improves management of the online discussion by the system,
    wherein the format comprises a web-based visualization of a hierarchical relation map associated with a user interface,
    wherein the hierarchical relation map includes a first level corresponding to the first domain-specific concept and the domain-specific second concept.

2. The system of claim 1, wherein the processor is further to compute a first relevance that corresponds to the first domain-specific concept and the first subdiscussion based at least in part on a frequency associated with the first domain-specific concept.

3. The system of claim 1, wherein the processor is further to:
    identify a third domain-specific concept relevant to a second subdiscussion associated with the online discussion;
    determine a second relation between the first domain-specific concept and the third domain-specific concept; and
    group the first subdiscussion with the second subdiscussion based at least in part on the second relation.

4. A computer program product, the computer program product comprising a computer readable storage medium having program instructions for identifying features including relevance within an online discussion embodied therewith, the program instructions executable by a processor to cause:
    identifying, by the processor, a first domain-specific concept relevant to a first subdiscussion associated with the online discussion to support presenting the first and second domain-specific concepts in a format;
    identifying a second domain-specific concept relevant to the first subdiscussion; and
    performing control operations to determine a first relation between the first domain-specific concept and the second domain-specific concept to support presenting the first relation in the format that improves management of the online discussion by the system,
    wherein the format comprises a web-based visualization of a hierarchical relation map associated with a user interface,
    wherein the hierarchical relation map includes a first level corresponding to the first domain-specific concept and the domain-specific second concept.

5. The computer program product of claim 4, wherein the program instructions are further executable by the processor to cause computing a first relevance that corresponds to the first domain-specific concept and the first subdiscussion based at least in part on a frequency associated with the first domain-specific concept.

6. The computer program product of claim 4, wherein the program instructions executable by the processor to cause:
- identify a third domain-specific concept relevant to a second subdiscussion associated with the online discussion;
- determine a second relation between the first domain-specific concept and the third domain-specific concept; and
- group the first subdiscussion with the second subdiscussion based at least in part on the second relation.

7. The system of claim 3, wherein the hierarchical relation map includes a second level corresponding to the third domain-specific concept.

\* \* \* \* \*